United States Patent [19]
Honeycutt

[11] Patent Number: 4,862,616
[45] Date of Patent: Sep. 5, 1989

[54] METHOD AND STRUCTURE FOR SIMULATING A NEON SIGN USING PARTIALLY COATED TRANSPARENT PLASTIC ROD

[76] Inventor: Billy O. Honeycutt, 500 Boxwood Dr., Jacksonville, Ark. 72076

[21] Appl. No.: 53,803

[22] Filed: May 26, 1987

[51] Int. Cl.[4] .......................... G09F 13/16; B29C 53/02
[52] U.S. Cl. .......................................... 40/616; 40/545; 40/582; 264/129; 264/131; 264/339
[58] Field of Search ................. 40/542, 543, 544, 616, 40/584, 545, 559, 560, 561, 582; 264/129, 131, 295, 339

[56] References Cited

U.S. PATENT DOCUMENTS 2,486,859 11/1949 Meijer .................................. 40/543

FOREIGN PATENT DOCUMENTS 171776 2/1986 European Pat. Off. .

*Primary Examiner*—Evan Lawrence

[57] ABSTRACT

A continuous length of transparent plastic rod is fabricated into meaningful letters, numbers, or other shapes wherein the meaningful portions are coated with a pigment and/or reflective substance leaving the portions or spaces between meaningful portions transparent and not readily visible, whereby the structure as a unit resembles a neon sign.

4 Claims, 1 Drawing Sheet

FIG. 1
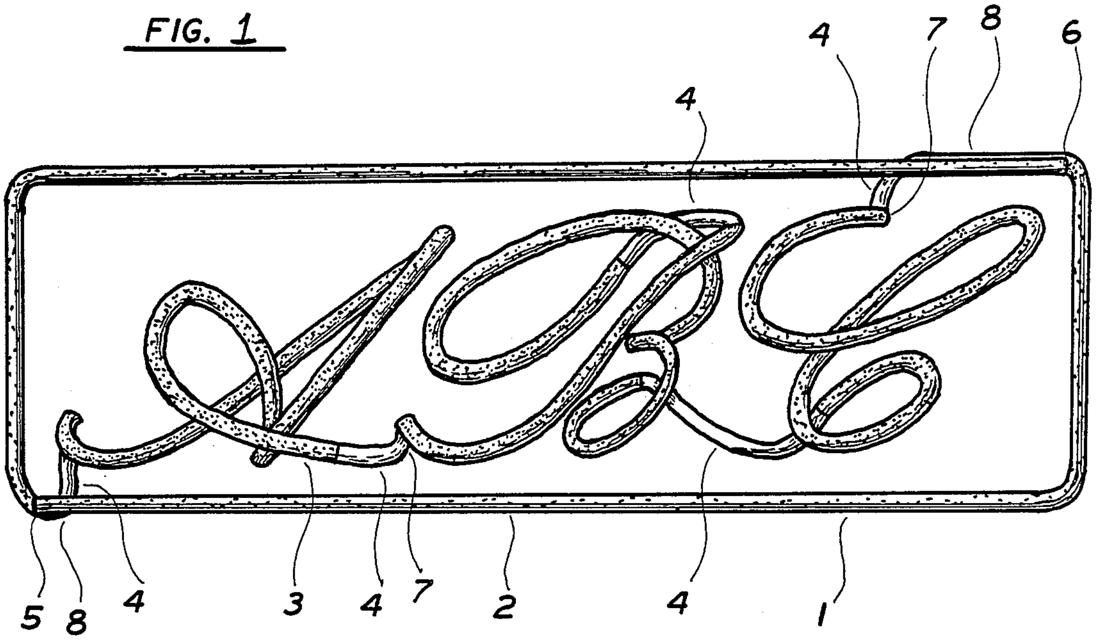
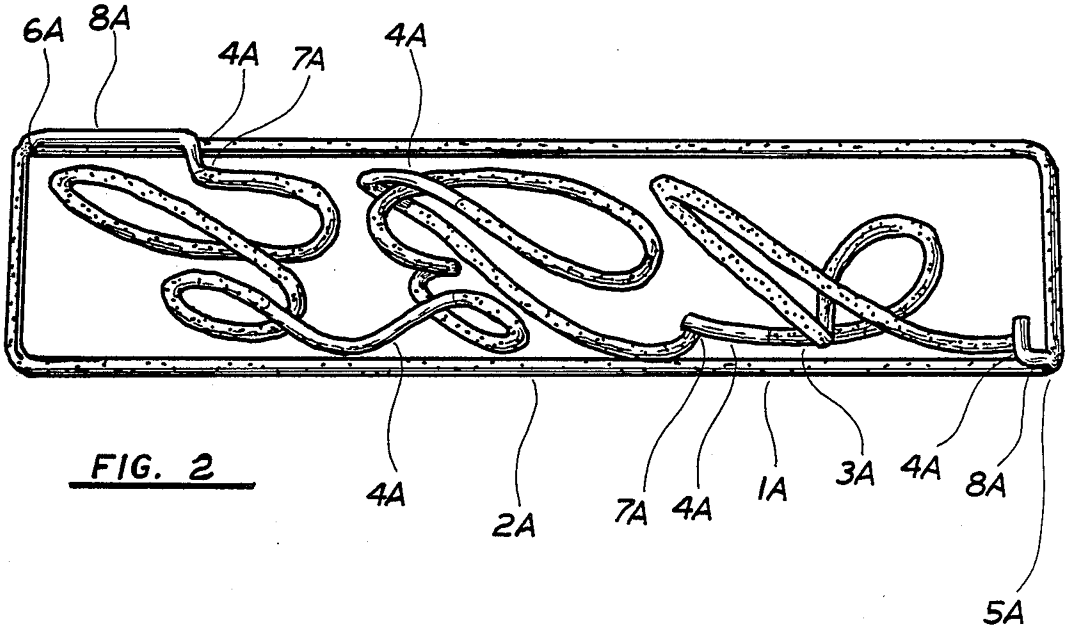
FIG. 2

METHOD AND STRUCTURE FOR SIMULATING A NEON SIGN USING PARTIALLY COATED TRANSPARENT PLASTIC ROD

BACKGROUND AND USEFULNESS OF THE INVENTION

This invention generally relates to simulated neon illumination and specifically to an improved means of simulating neon illumination through fabricated multiple sign characters from a continuous length of transparent rod which is subsequently partially coated.

Heretofore no development is evident in prior art to indicate any usage of continuous transparent rod to fabricate multiple sign characters. The traditional uses of plastic rod itself has been for push rods, support rods, towel racks, and other utility type purposes. Transparent plastic rod offers many advantages as a medium in art and sign articles over the usage of an illuminating gas as will be evident. The prior art shows fluorescent pigmented plastic tubing and rod as possible means of simulating neon illumination. Plastic tubing differs greatly from plastic rod in the aforementioned application. Plastic rod due to being a solid material will hold a shape and is able to carry it's own weight. Plastic tubing is a very flexible material requiring a backing material for support or the use of wire or cable to be inserted inside it's length. The ease of making bends and curves using plastic tubing with wire or cable inside it's length substantially lessens to a point of major difficulty as the diameter of the wire or cable is increased due to the relatively fragile nature of plastic tubing in relation to the metal. When a small size wire is used in a relatively larger size plastic tubing the curvature of the bends will not be uniform and crimping of the plastic tubing will be evident. In fact crimping especially around tighter bends represents a major disadvantage in the aforementioned use of plastic tubing. In contrast, this application teaches the use of fabricating transparent plastic rod into various shapes, or characters, and subsequently coating the segments which are meant to be readily viewable. The spaces between the various shapes, or characters, as above referred which are not meant to be readily viewable need no treatment. In a production situation, lack of any coating treatment of these aforementioned segments offers considerable economic advantages due to completely eliminating several steps toward achievement of a completed product including preparation, application of the pigment, and labor and material costs of the additional coatings. In addition, the transparent character of the plastic rod described in this application blends in with any background and completely eliminates the need for color matching to a particular background to achieve a non-apparent appearance.

As opposed to neon tubing fabrication, plastic rod is simple and inexpensive to fabricate. Each individual bend has to be heated when working with glass neon tubing, blown out to shape,, and then normally cooled before being heated again. Plastic rod can be heated without regard for many of the characteristics of glass. Long lengths can be heated and since hot soft plastic takes a much longer period of regain stiffness many bends can be made with the same heating. Means for heating plastic rod so as to provide for semi-automatic and automatic fabrication is also possible. The differences in temperature softening points between glass and plastic are also great since plastic softens around 275° F. thereby requiring far less equipment and expense. In addition considerable safety measures must be taken when around illuminated neon due to the accompanying transformer's output of secondary high voltage. Government commissions have created many restrictions as to how neon can be manufactured due to the many safety factors involved. Transparent plastic rod which is subsequently coated would have no similar restrictions. Plastic rod also offers considerable ease in mounting and displaying as opposed to neon tubing since neon requires a heavy expensive transformer, is considerably more fragile, and requires a frame or additional support for mounting. Since plastic rod is relatively light in weight, attachment to windows through use of small suction cups is possible along with many other simple mounting procedures. Selection of color coatings for transparent plastic rod is far greater and cheaper than unusual colors of neon illumination. Whereas the cost and safety factors of neon has limited it's use primarily to commercial purposes, transparent coated plastic rod can be utilized by the general public to signify sports related preferences, social organization preferences, or any other preferences in addition to commercial advertisements.

SUMMARY

The present invention offers a new sign medium and a method for its production in which a practical method of neon resemblance is attained through fabricating a continuous length of transparent plastic rod into meaningful sign shapes. The transparent plastic rod structure is subsequently coated along portions intended to be readily viewable thereby leaving spaces between meaningful portions transparent and not readily visible. The resulting structure as herein described offers many advantages over the prior art including improved economics in manufacturing and improved blending-in with different backgrounds.

Further objects and advantages of my invention will become apparent from a consideration of the drawings and ensuing description thereof.

BRIEF DESCRIPTION OF THE DRAWINGS

FIG. 1 is a direct frontal view of an alphabetic structure which signifies an article fabricated from a continuous length of transparent plastic rod and the similarity in appearance of such a structure to neon illumination.

FIG. 2 is a rear overview appearance of the FIG. 1 depiction viewed at an approximate forty-five degree angle from the bottom of the structure.

DETAILED DESCRIPTION

The drawings depicted in FIGS. 1 and 2 represent an example of an article which can be fabricated from a continuous length of transparent plastic rod which is subsequently coated. Many other types of art and sign articles can be fabricated from continuous lengths of transparent plastic rod to simulate illuminated neon and the structured details of this particular article is shown by way of example and not of restriction.

With reference to the illustrations, wherein like reference characters designate corresonding parts throughout the figures, a completed article signifying a structure fabricated from transparent plastic rod is exhibited frontally in FIG. 1 and is indicated generally by the reference character 1. It can be readily perceived that the general overall appearance of the herein referenced frontal 1 compares closely to that of a like structure which would be made from glass tubing for neon illumination due to a great extent to the continuous length of rounded material used. The dotted areas on frontal structure 1 represented by reference character 2 for the frame and reference character 3 for an letter signifies the portion of the frontal structure 1 which is subsequently coated with a readily viewable pigment and/or reflective substance. Reference character 4 represents a portion of frontal structure 1 which is a space between letters, numbers, or meaningful art or linear sign shapes which is not meant to be readily visible. Therefore reference character 4 denotes those areas of frontal structure 1 which are not coated with pigment and remain transparent since the entire structure is initially fabricated of transparent plastic rod material. Reference characters 5 and 6 are ends of the transparent plastic rod and are fabricated so as to create a direct visual frontal impression of a continuous outline for the frontal structure 1 illustrated. Reference characters 7 are bends in the transparent plastic rod utilized to set up the beginning direction of the next letter or for a change in direction of the transparent plastic rod to take the shortest route to a location which is not meant to be readily visible. Reference characters 8 are uncoated portions in the length of transparent plastic rod which are not meant to be readily visible and are situated directly behind coated portions of frontal structure 1.

FIG. 2 being a rear overview appearance of the FIG. 1 depiction viewed at an approximate forty-five degree angle from the bottom of the structure is indicated generally by the reference character 1A. The dotted areas on rear structure 1A represented by reference character 2A for the frame and reference character 3A for the letters signifies the portions of rear structure 1A which are coated as stated above and are those portions of rear structure 1A in which the opposite sides are intended to be readily viewed frontally. Correspondingly reference character 4A represents portions of rear structure 1A which are spaces between letters, numbers, or meaningful art or linear sign shapes which are not meant to be readily visible. Therefore, as indicated above, reference character 4A denotes areas of rear structure 1A which are not coated with a pigment and remain transparent. Reference characters 5A and 6A are ends of the transparent plastic rod and are positioned so as to create a direct visual frontal impression of a continuous outline for the frontal structure 1 illustrated. Reference characters 7A are bends in the transparent plastic rod utilized to set up the beginning direction of the next letter, or figure, or for a change in direction of the transparent plastic rod to take the shortest route to a location which is not meant to be readily visible. Reference characters 8A are uncoated portions in the length of transparent plastic rod which are not meant to be readily visible and are situated directly behind coated portions of frintal structure 1.

The actual normal fabrication of frontal structure 1 would involve heating the transparent plastic rod to a softened condition so as to make it easily workable and laying this heated transparent plastic rod into template pattern grooves starting at the end represented by reference character 5. The aforementioned template pattern would be grooved with the figure of the structure appearing backward as FIG. 2 illustrates so that when the fabricated structure is completed the meaningful sign lines and border, when viewed from the front, would be on a fairly flat plane. The aforementioned template can be a wooden board with the grooves routed onto it's flat surface. From the normal beginning which is at end 5 the transparent plastic rod would be layed so as to form the lower outline of the border and then through various curves, as can be followed in FIG. 2, begin to form the letter C. The length of the transparent plastic rod can be continued to be followed with it's various curves and bends until the finished structure is completed and the opposite end from the beginning end 5 rests at position 6. When this fabricated structure is cooled and set the coating is applied to the surface of the portions in the length of the transparent plastic rod which are to be readily viewed as indicated above.

While the above description contains many specificities, these should not be construed as limitations on the scope of the invention, but rather as an exemplification of one preferred embodiment thereof. Many other variations are possible, for example, different diameters of transparent plastic rod could be combined in fabricating an article. Accordingly, the scope of the invention should be determined not by the embodiment illustrated, but by the appended claims and their legal equivalents.

What I claim is:

1. A method of simulating the appearance of a neon sign comprising fabricating a continuous length of transparent plastic rod into a continuous length of rod comprising first portions in the shape of letters, numbers, or other linear sign shapes separated by second portions of said rod; and applying a readily viewable color coating to said first portions while leaving said second portions uncoated, whereby said second portions are not readily visible.

2. The method of claim 1 wherein said coating comprises a pigment and/or reflective substance.

3. A structure fabricated for sign purposes comprising a continuous transparent plastic rod having readily viewable color coated portions in the shape of letters, numbers, or other linear sign shapes, said coated portions being separated by uncoated transparent portions of said rod, whereby said transparent portions are not readily visible.

4. The structure of claim 3 wherein said coated portions are coated with a pigment and/or reflective substance.

* * * * *